US012434087B2

(12) United States Patent
McGehee

(10) Patent No.: US 12,434,087 B2
(45) Date of Patent: Oct. 7, 2025

(54) SYSTEM FOR REDUCING HIGH FALL STUNT INJURIES WHEN USING AN AIRBAG

(71) Applicant: UNIVERSAL CITY STUDIOS LLC, Universal City, CA (US)

(72) Inventor: William Vincent McGehee, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 1007 days.

(21) Appl. No.: 17/497,526

(22) Filed: Oct. 8, 2021

(65) Prior Publication Data

US 2023/0112659 A1 Apr. 13, 2023

(51) Int. Cl.
*A63B 6/02* (2006.01)
*A62B 1/22* (2006.01)
*A63B 24/00* (2006.01)

(52) U.S. Cl.
CPC .................. *A63B 6/02* (2013.01); *A62B 1/22* (2013.01); *A63B 24/0087* (2013.01);
(Continued)

(58) Field of Classification Search
CPC ... A63B 6/02; A63B 2220/30; A63B 2220/56; A63B 2220/76; A63B 2225/62; A63B 2230/01; A63B 2024/0093; A63B 2220/805; A63B 24/0087; A63B 2220/20; A63B 2225/09; A63B 2220/89; A62B 1/22
See application file for complete search history.

(56) References Cited

U.S. PATENT DOCUMENTS 7,269,866 B2 9/2007 Liu
7,357,728 B2 4/2008 Osler-Weppenaar
(Continued)

FOREIGN PATENT DOCUMENTS

CN 207970354 U 10/2018
CN 111888675 A 11/2020

OTHER PUBLICATIONS

International Search Report and Written Opinion, PCT/2021/063369, Mar. 2, 2022, 9 pgs.
(Continued)

*Primary Examiner* — Kamini S Shah
*Assistant Examiner* — Zachary Andrew Cain
(74) *Attorney, Agent, or Firm* — Fletcher Yoder, P.C.

(57) ABSTRACT

Aspects of the disclosure relate to methods, apparatus, and systems for optimizing an energy exerted on a performer falling from an elevated platform and impacting an airbag. A system is configured to determine a weight of the performer to fall from the elevated platform toward the airbag, measure a distance between the elevated platform and the airbag, and set an air pressure of the airbag based on the weight and the distance prior to the performer falling toward the airbag. The system is further configured to determine, while the performer falls toward the airbag, a velocity the performer will reach upon impact with the airbag, and adjust the air pressure of the airbag based on the velocity while the performer falls toward the airbag to optimize an energy exerted on the performer when the performer impacts the airbag.

20 Claims, 5 Drawing Sheets

(52) U.S. Cl.
CPC ....... *A63B 2220/30* (2013.01); *A63B 2220/56* (2013.01); *A63B 2220/76* (2013.01); *A63B 2225/62* (2013.01); *A63B 2230/01* (2013.01)

(56) References Cited

U.S. PATENT DOCUMENTS

| | | | | |
|---|---|---|---|---|
| 7,530,128 | B2 | 5/2009 | Wu | |
| 7,591,036 | B2 | 9/2009 | Lin et al. | |
| 8,973,193 | B2 | 3/2015 | Codos | |
| 10,500,429 | B1 | 12/2019 | Bagumyan et al. | |
| 2003/0024050 | A1 | 2/2003 | Boso et al. | |
| 2004/0083550 | A1* | 5/2004 | Graebe, Jr. | A47C 27/083 5/713 |
| 2005/0081299 | A1 | 4/2005 | Torres | |
| 2006/0001545 | A1 | 1/2006 | Wolf | |
| 2007/0193830 | A1* | 8/2007 | Guralnik | A62B 1/22 182/137 |
| 2009/0000037 | A1 | 1/2009 | Graebe, Jr. et al. | |
| 2017/0099424 | A1* | 4/2017 | Jones | G02B 27/0093 |
| 2019/0314652 | A1 | 10/2019 | Millar | |
| 2020/0322522 | A1 | 10/2020 | Jones | |

OTHER PUBLICATIONS

EP Extended European Search Report for European Application No. 21960078.0 mailed Jul. 11, 2025.

* cited by examiner

SYSTEM FOR REDUCING HIGH FALL STUNT INJURIES WHEN USING AN AIRBAG

TECHNICAL FIELD

The technology discussed below relates generally to airbag systems, and more particularly, to airbag safety systems used for high fall stunts.

INTRODUCTION

The act of a person falling from an elevated height has been implemented in a variety of applications, such as sporting, amusement, and entertainment applications. To protect the person from injury, different safety systems for reducing a force exerted on the falling person have been utilized.

An example of an entertainment application includes a high fall stunt performed during a live show or recorded media production. In the high fall stunt, a safety system including a landing pad (e.g., foam pad or airbag) may be used to lessen an amount of energy exerted on a performer falling from a particular height toward the ground. For example, the performer may fall from an elevated platform into the landing pad located a distance (e.g., 4 to 10 meters) below the platform.

An amount of energy exerted on the performer may be decreased based on a density of the landing pad. Ideally, the landing pad has an appropriate density such that when the performer hits the landing pad, the performer does not hit excessively hard causing a diaphragm spasm (e.g., wind being knocked out of the performer) and/or the performer's head (which is not as dense as the performer's core) to be slammed against a surface of the landing pad.

In previous safety systems, the density of the landing pad is set dependent on the performer's weight. For example, some time prior to the high fall stunt being performed, the performer's weight may be measured and a suitable density for the landing pad based on the performer's weight is determined. Accordingly, if the landing pad is a foam pad, an amount of padding may be added or subtracted to the landing pad to realize the determined density. Similarly, if the landing pad is an airbag, an amount of air pressure may be added or subtracted to the landing pad to realize the determined density. However, the previous safety systems only account for the weight of the performer to determine the appropriate density of the landing pad, and the appropriate density is determined in a non-real-time manner well before the performance of the high fall stunt. Accordingly, the present disclosure is directed to improving the safety of a stunt performer in a high fall stunt application by determining an appropriate airbag density utilizing different types of information (e.g., platform height, performer's falling velocity, wind speed, etc.) and adjusting the amount of air pressure in the airbag based on the determined density in real-time (e.g., during the performance of the high fall stunt).

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure relate to methods, apparatus, and systems for optimizing an energy exerted on a performer falling from an elevated platform and impacting an airbag. An airbag system includes an airbag configured to sustain an air pressure and a control system communicatively coupled to the airbag. The control system is configured to determine a weight of a performer to fall from an elevated platform toward the airbag, measure a distance between the elevated platform and the airbag, set an air pressure of the airbag based on the weight and the distance prior to the performer falling toward the airbag, determine, while the performer falls toward the airbag, a velocity the performer will reach upon impact with the airbag, and adjust the air pressure of the airbag based on the velocity while the performer falls toward the airbag to optimize an energy exerted on the performer when the performer impacts the airbag. The control system may include a scale configured to determine the weight of the performer to fall from the elevated platform toward the airbag. The control system may also include one or more of a laser range finder, an optical sensor, a lidar sensor, or a radar sensor configured to measure the distance between the elevated platform and the airbag, and determine the velocity the performer will reach upon impact with the airbag. The control system may further include an anemometer configured to monitor at least one of a wind velocity or a wind direction of wind engaging the performer while the performer falls toward the airbag. Other aspects, embodiments, and features are also claimed and described.

In one example, a method of optimizing an energy exerted on a performer falling from an elevated platform and impacting an airbag is disclosed. The method includes determining a weight of a performer to fall from an elevated platform toward an airbag, measuring a distance between the elevated platform and the airbag, setting an air pressure of the airbag based on the weight and the distance prior to the performer falling toward the airbag, determining, while the performer falls toward the airbag, a velocity the performer will reach upon impact with the airbag, and adjusting the air pressure of the airbag based on the velocity while the performer falls toward the airbag to optimize an energy exerted on the performer when the performer impacts the airbag.

In one example, an airbag control system for optimizing an energy exerted on a performer falling from an elevated platform and impacting an airbag is disclosed. The airbag control system includes at least one processor and a memory coupled to the at least one processor. The at least one processor and the memory are configured to determine a weight of a performer to fall from an elevated platform toward an airbag, measure a distance between the elevated platform and the airbag, set an air pressure of the airbag based on the weight and the distance prior to the performer falling toward the airbag, determine, while the performer falls toward the airbag, a velocity the performer will reach upon impact with the airbag, and adjust the air pressure of the airbag based on the velocity while the performer falls toward the airbag to optimize an energy exerted on the performer when the performer impacts the airbag.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and/or packaging arrangements.

A variety of sporting, amusement, and entertainment applications involve a performer falling from an elevated platform toward the ground. Accordingly, a safety system for reducing an impact energy exerted on the falling performer may be utilized to protect the performer from injury.

Figure 1:
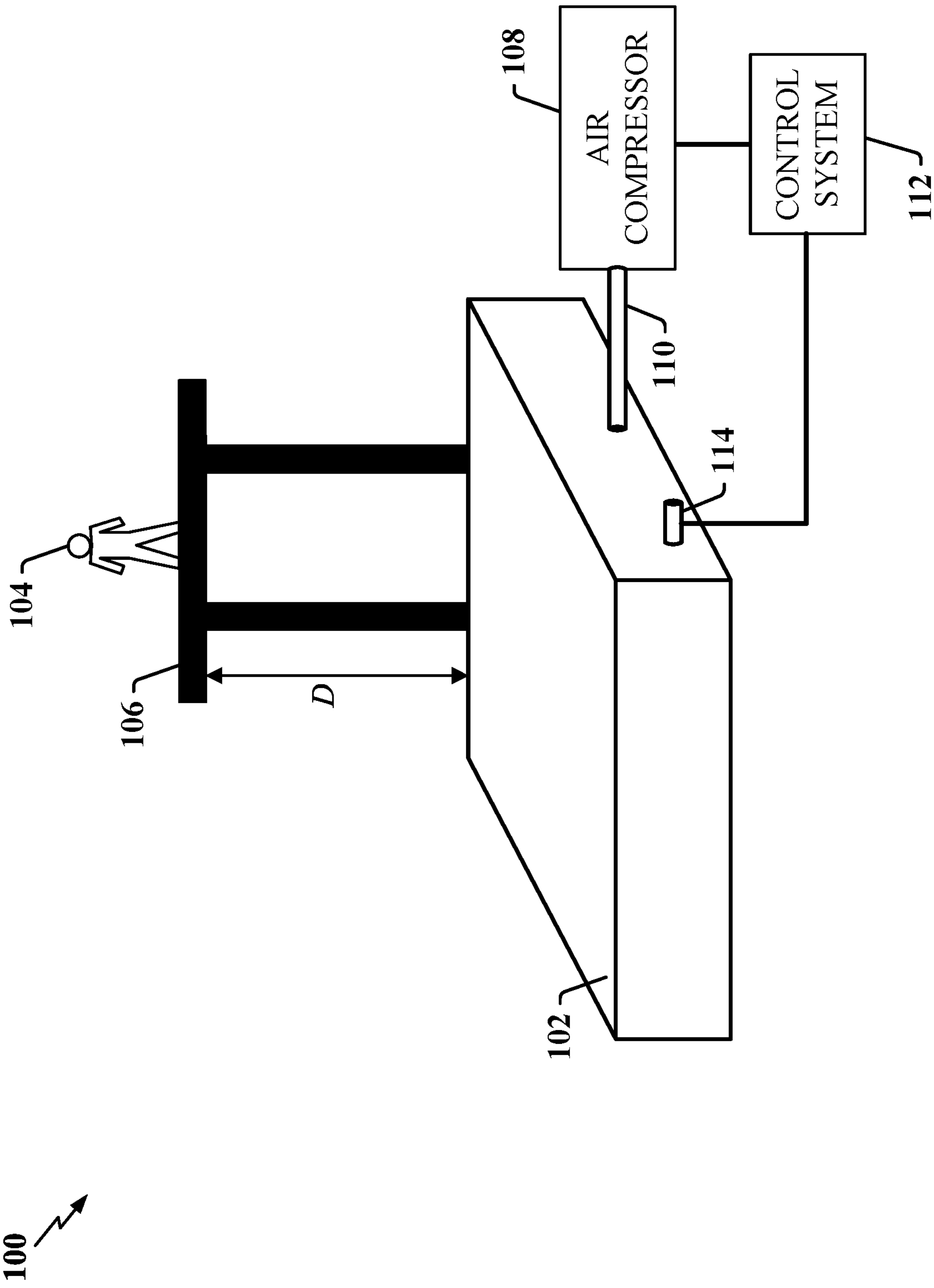
FIG. 1 illustrates an example safety system according to an aspect of the present disclosure.

FIG. 1 illustrates an example safety system 100 according to an aspect of the present disclosure. The safety system 100 may, for example, be implemented in a high fall stunt application for entertainment purposes. The safety system 100 may include a landing pad 102 configured to cushion the fall of a performer 104 falling from a particular height. In particular, the landing pad 102 is configured to lessen an amount of energy exerted on the performer 104 hitting/impacting the landing pad 102 at the end of the fall as compared to an energy exerted on the performer impacting the ground. The landing pad 102 may, for example, be a foam pad, an airbag, or any other type of cushioning device capable of softening the fall of (i.e., reducing the energy exerted on) the falling performer 104. In an aspect, the performer 104 may fall from an elevated platform 106 located a distance D (e.g., 4 to 10 meters) above the landing pad 102.

In an aspect, the landing pad 102 is an airbag configured to sustain an air pressure. Accordingly, the safety system 100 may further include an air compressor 108 (or any other type of air supplying device) for injecting air into the airbag. The air compressor 108 may be coupled to the airbag via one or more inlet tubes 110. The safety system 100 may also include a control system 112 coupled to the air compressor 108 for regulating an amount of air injected into the airbag. The control system 112 may further be coupled to one or more outlet valves 114 of the airbag for regulating an amount of air released from the airbag.

In an aspect, an amount of energy exerted on the performer 104 may be decreased based on a density of the landing pad 102. Ideally, the landing pad 102 has an appropriate density such that when the performer 104 hits the landing pad 102, the performer 104 does not hit excessively hard causing an injury. Possible injuries may include a diaphragm spasm (e.g., wind being knocked out of the performer) and/or the performer's head being violently moved in a particular direction (e.g., forward, backward, or sideways) upon slamming against a harder than ideal surface of the landing pad 102.

In an aspect, the density of the landing pad 102 may be set based on the performer's weight. For example, some time prior to the high fall stunt being performed, the performer's weight may be measured and an appropriate pad density for optimizing the safety of the performer 104 may be determined according to the performer's weight. In an example where the landing pad 102 is a foam pad, an amount of padding may be added or subtracted to the foam pad to realize an appropriate foam pad density. In another example where the landing pad 102 is an airbag, an amount of air may be injected into or released from the airbag to realize an appropriate air pressure density of the airbag.

Typically, the determination of the appropriate density for the landing pad 102 may be solely based on the performer's weight. However, other types of available/determinable information related to the high fall stunt (e.g., platform height, falling velocity, wind speed, etc.) may also be used to determine the appropriate pad density. Hence, the typical pad density determination may limit optimization of the performer's safety if the other types of information related to the high fall stunt are not accounted for in the determination. Moreover, the typical pad density determination is conducted in a real-time manner (e.g., well before the performance of the high fall stunt). Thus, the typical pad density determination may further limit the optimization of the performer's safety since the determination does not account for conditions (e.g., technical and/or environmental conditions) changing during the performance of the high fall stunt.

In an aspect, the present disclosure is directed to improving the safety of a stunt performer in a high fall stunt application by determining an appropriate airbag density utilizing different types of information (e.g., platform height, performer's falling velocity, wind speed, etc.) and adjusting the amount of air pressure in the airbag based on the determined density in real-time (e.g., during the performance of the high fall stunt).

Figure 2:
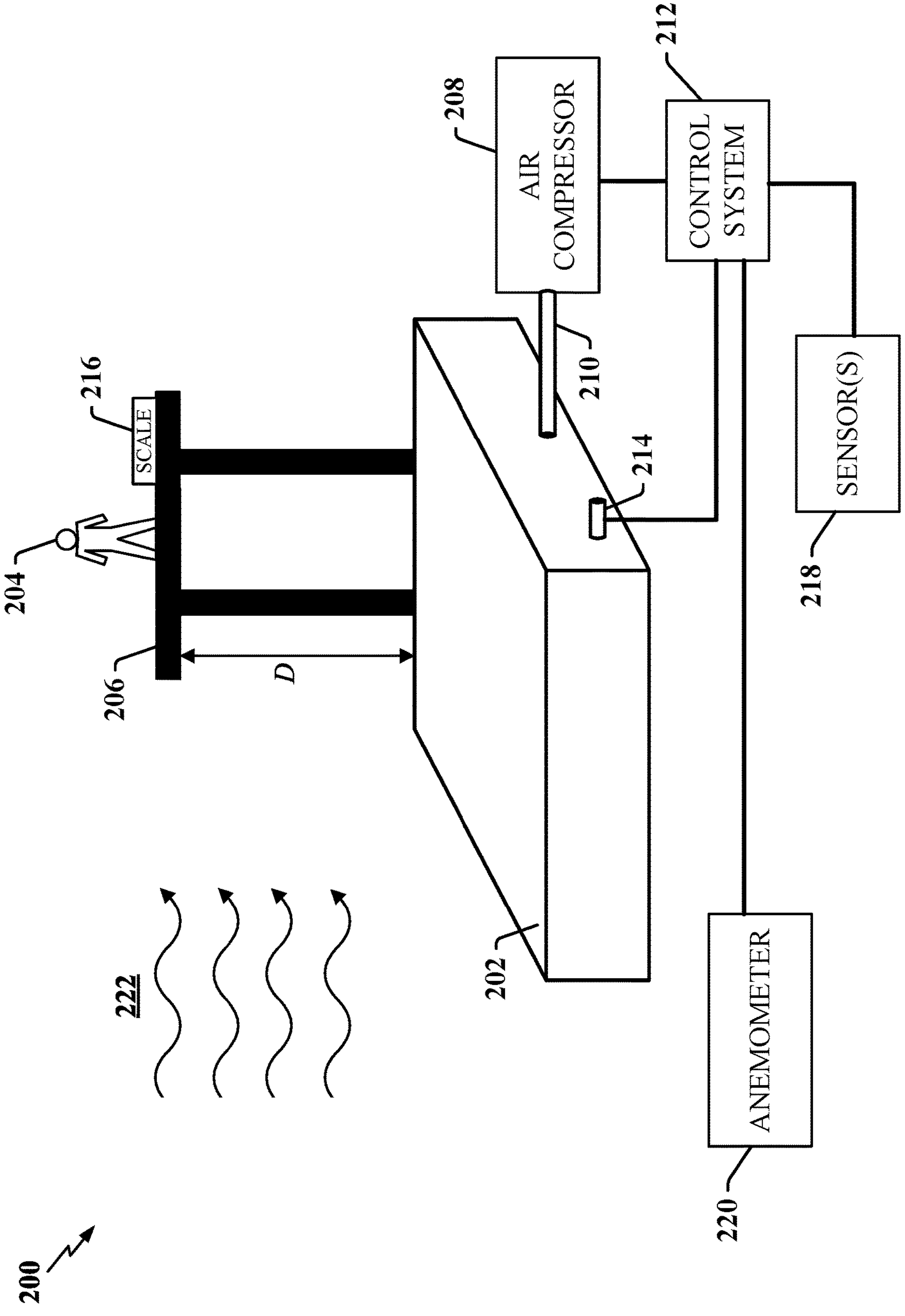
FIG. 2 illustrates an example safety system according to an aspect of the present disclosure.

FIG. 2 illustrates an example safety system 200 according to an aspect of the present disclosure. The safety system 200 may, for example, be implemented in a high fall stunt application for entertainment purposes. The safety system 200 may include a landing pad 202 configured to cushion the fall of a performer 204 falling from a particular height. In particular, the landing pad 202 is configured to lessen an amount of energy exerted on the performer 204 hitting/impacting the landing pad 202 at the end of the fall as compared to an energy exerted on the performer impacting the ground. The landing pad 202 may, for example, be a foam pad, an airbag, or any other type of cushioning device capable of softening the fall of (i.e., reducing the energy exerted on) the falling performer 204. An example landing pad 202 may have a length of 6 to 12 meters, a width of 6 to 10 meters, and a depth of 2 to 3 meters. In an aspect, the performer 204 may fall from an elevated platform 206 located a distance D (e.g., 4 to 10 meters) above the landing pad 202.

In an aspect, if the landing pad 202 is an airbag configured to sustain an air pressure, then the safety system 200 may further include an air compressor 208 (or any other type of air supplying device) for injecting air into the airbag. The air compressor 208 may be coupled to the airbag via one or more inlet tubes 210. The safety system 200 may also include a control system 212 coupled to the air compressor 208 (via a wired or wireless connection) for regulating an amount of air injected into the airbag. The control system 212 may further be coupled to one or more outlet valves 214 of the airbag (via a wired or wireless connection) for regulating an amount of air released from the airbag.

The control system 212 may also be coupled (via a wired or wireless connection) to a scale 216, one or more sensors 218, and an anemometer 220. The scale 216 is configured to determine a weight of the performer 204, for example, when the performer 204 stands on the scale prior to the performance of the high fall stunt. The one or more sensors 218 are configured to measure a distance between the elevated platform 206 and the landing pad 202 (distance D). Additionally, or alternatively, the one or more sensors 218 are configured to determine a velocity (actual velocity) that the performer 304 will reach upon impact with the landing pad 202. For example, the one or more sensors 218 may include a laser range finder, an optical sensor, a lidar sensor, a radar sensor, a velocity sensor, a machine vision camera, etc. The anemometer 220 is configured to determine a velocity and/or a direction of wind 222 engaging the performer 204 while the performer falls toward the landing pad 202.

In an aspect, information such as the weight of the performer 204, the distance between the elevated platform 206 and the landing pad 202 (distance D), the velocity of the performer 204 (actual velocity), the wind velocity, and/or the wind direction may be sent to the control system 212. The control system 212 may then use the information to set or adjust an air pressure of the landing pad 202.

In an aspect, the control system 212 may receive the determined weight of the performer 204 from the scale 216 and the measured distance between the elevated platform 206 and the landing pad 202 (distance D) from the one or more sensors 218. Thereafter, the control system 212 may set an air pressure of the landing pad 202 based on the determined weight of the performer 204 and the measured distance prior to the performer 204 initiating the fall toward the landing pad 202. The air pressure may be set to a pressure value within a range of pressure values for optimizing the energy exerted on (i.e., preventing injury to) the performer 204 when the performer impacts the landing pad 202. In an aspect, the range of pressure values may be determined based on empirical testing, data regarding an amount of impact energy a human body can safely endure, and/or characteristic data regarding materials used to construct the landing pad.

An object falls at a normal rate. However, a certain amount of time will elapse before the object reaches a terminal velocity (maximum falling velocity). In an aspect, the control system 212 may determine a velocity of the performer 204 as the performer falls from the elevated platform 206. Moreover, the control system 212 may determine a theoretical velocity ($V_T$) the performer will reach immediately prior to, or upon, impact with the landing pad 202 based on the distance between the elevated platform 206 and the landing pad 202 (distance D). For example, the theoretical velocity ($V_T$) may be calculated according to the following equation:

$$V_T=\sqrt{2gD}, \quad 1)$$

where g is the acceleration due to gravity (9.8 $m/s^2$) and D is the distance between the elevated platform 206 and the landing pad 202.

Furthermore, the control system 212 may determine a theoretical energy ($E_T$) exerted on the performer 204 upon impact with the landing pad 202 based on the weight of the performer 204 and the theoretical velocity $V_T$. For example, the theoretical energy ($E_T$) may be calculated according to the following equation:

$$E_T=(½)mV_T^2=mgD, \quad 2)$$

where m is the mass (weight) of the performer 204, $V_T$ is the theoretical velocity, g is the acceleration due to gravity (9.8 $m/s^2$), and D is the distance between the elevated platform 206 and the landing pad 202. Based on the theoretical energy $E_T$, the control system 212 may set the air pressure of the landing pad 202 prior to the performer 204 falling toward the landing pad 202 to optimize the energy exerted on the performer when the performer impacts the landing pad. In an aspect, the air pressure is set to a pressure value within a range of pressure values that will prevent injury to the performer 204 when impacting the landing pad 202. For example, if the performer 204 is a heavyweight person, then the landing pad 202 may be set to a higher air pressure to prevent the landing pad from being overly soft, which may result in the performer landing too far into the landing pad and causing injury. If the performer 204 is a lightweight person, then the landing pad may be set to a lower air pressure to prevent the landing pad from being too hard, which may result in the performer slamming into an overly firm surface and causing injury.

In an aspect, the control system 212 may also receive from the one or more sensors 218, the actual velocity ($V_A$) that the performer 204 will reach upon impact with the landing pad 202. Based on the actual velocity, the control system 212 may dynamically (in real-time) adjust the air pressure (change the set air pressure) of the landing pad 202 while the performer 204 falls toward the landing pad 202. The air pressure is adjusted to optimize the energy exerted on (i.e., prevent injury to) the performer when the performer impacts the landing pad 202.

In an aspect, to adjust the air pressure of the landing pad 202, the control system first determines whether the actual velocity ($V_A$) is different from the calculated theoretical velocity ($V_T$). If $V_A$ is not within a threshold range of $V_T$, then the control system 212 calculates a predicted energy ($E_P$) exerted on the performer upon impact with the landing pad 202 based on the weight of the performer 204 and the actual velocity $V_A$. For example, the predicted energy ($E_P$) may be calculated according to the following equation:

$$E_P=(½)mV_A^2=mgD, \quad 3)$$

where m is the mass (weight) of the performer 204, $V_A$ is the actual velocity, g is the acceleration due to gravity (9.8 $m/s^2$), and D is the distance between the elevated platform 206 and the landing pad 202. Based on the predicted energy $E_P$, the control system 212 may adjust the air pressure (change the set air pressure) of the landing pad 202 in real-time while the performer 204 falls toward the landing pad 202. In an aspect, the air pressure is adjusted to a pressure value within a range of pressure values that will prevent injury to the performer 204 when impacting the landing pad 202.

Figure 3:
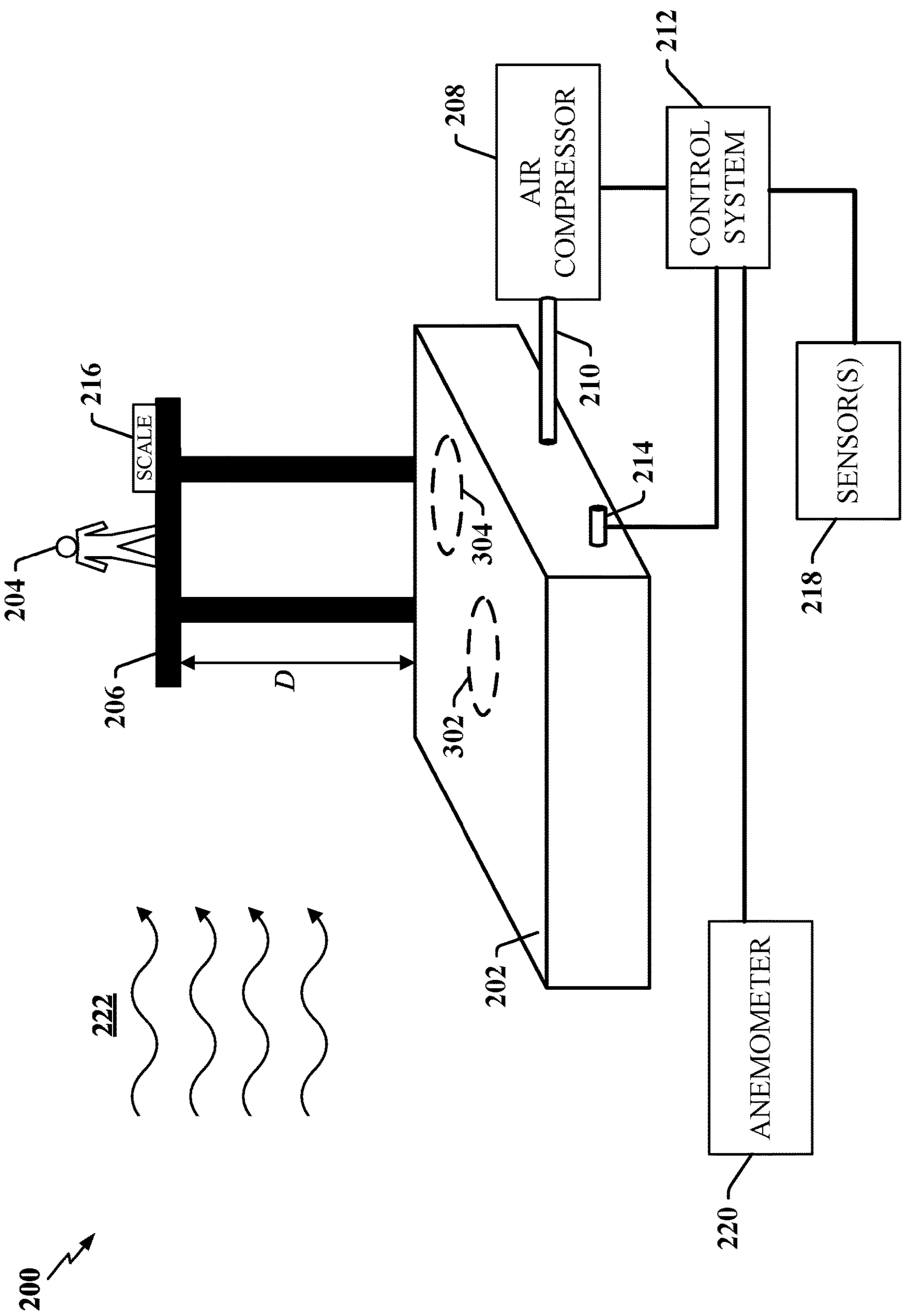
FIG. 3 illustrates the example safety system of FIG. 2 configured to adjust for an off-axis alignment of a performer according to an aspect of the present disclosure.

FIG. 3 illustrates the example safety system 200 configured to adjust for an off-axis alignment of the performer 204 according to an aspect of the present disclosure. During a high fall stunt, the performer 204 may aim for a target area 302 of the landing pad 202 (e.g., center of the landing pad) to end the fall. The target area 302 may be a location at which the air pressure of the landing pad 202 is set/adjusted to best optimize the energy exerted on the performer when the performer impacts the landing pad. However, external factors such as the wind 222 may cause the performer 204 to deviate from the target area 302 (e.g., become misaligned, out of position, or off-axis) during the fall.

In an aspect, the one or more sensors 218 (e.g., laser range finder, optical sensor, lidar sensor, radar sensor, velocity sensor, machine vision camera, etc.) may detect whether the performer 204 is misaligned, out of position, or off-axis with the target area 302 and send corresponding information to the control system 212. Additionally, or alternatively, the anemometer 220 may measure the wind velocity and/or the wind direction of the wind 222 and send corresponding information to the control system 212. The control system 212 may then determine whether the falling performer 204 is misaligned with the target area 302 based on the wind velocity and/or the wind direction.

In an aspect, upon detecting/determining whether the performer 204 is misaligned with the target area 302, the control system 212 may determine a predicted area 304 where the performer will impact the landing pad 202. The predicted area 304 may be an off-center portion (outside edge) of the landing pad 202 and determined based on the information received from the one or more sensors 218 and/or the anemometer 220. Thereafter, the control system 212 may adjust the air pressure of the landing pad 202 at the predicted area 304 while the performer falls toward the landing pad 202 so that the performer is less likely to be injured.

In an aspect, the air pressure at the predicted area 304 is adjusted to a pressure value within a range of pressure values to optimize the energy exerted on (i.e., prevent injury to) the performer when the performer impacts the predicted area 304. For example, the control system 212 may increase or decrease the air pressure at the predicted area 304 separately from the target area 302 or any other area of the landing pad 202. This allows air to be released at the same rate from all areas of the landing pad 202 when the performer impacts the predicted area 304, and thus, optimize (lessen) the energy exerted on the performer.

Figure 4:
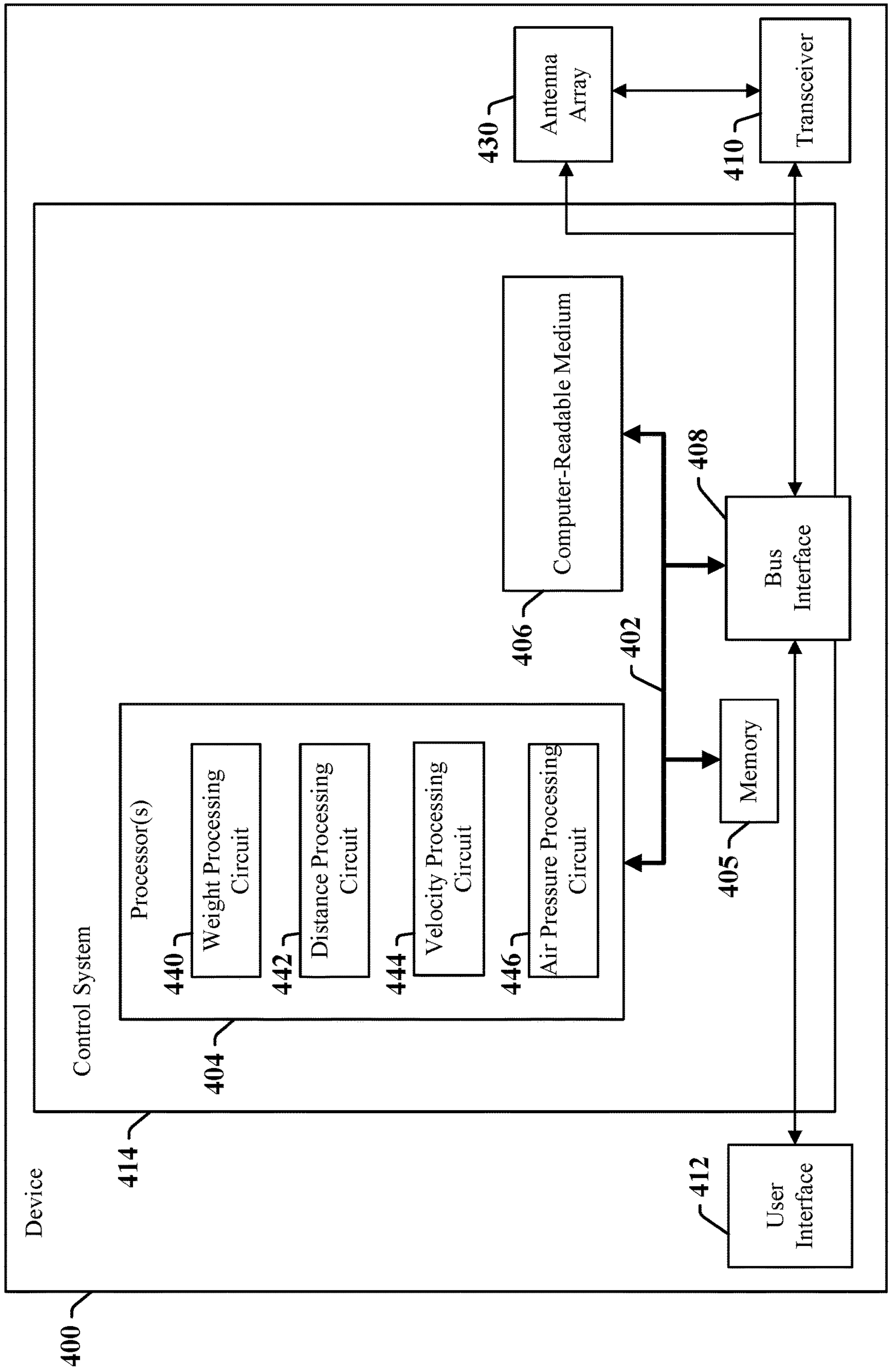
FIG. 4 is a block diagram illustrating an example of a hardware implementation for an exemplary device employing a control system configured to optimize an energy exerted on a performer falling from an elevated platform and impacting an airbag according to an aspect of the present disclosure.

FIG. 4 is a block diagram illustrating an example of a hardware implementation for an exemplary device 400 employing a control system 414. For example, the device 400 may be a computer, workstation, laptop, tablet, mobile phone, or any other type of electronic device capable of communicating with and/or controlling other electronic devices. Moreover, the control system 414 may be the control system 212 shown in FIG. 2. The control system 414 includes one or more processors 404. Examples of processors 404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the device 400 may be configured to perform any one or more of the functions described herein. That is, the processor 404, as utilized in a device 400, may be used to implement any one or more of the processes and procedures described and illustrated in FIG. 5.

In this example, the control system 414 may be implemented with a bus architecture, represented generally by a bus 402. The bus 402 may include any number of interconnecting buses and bridges depending on the specific application of the processing system 414 and the overall design constraints. The bus 402 communicatively couples together various circuits including one or more processors (represented generally by the processor 404), a memory 405, and computer-readable media (represented generally by the computer-readable medium 406). The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a communication interface or means for communicating with various other apparatus over a transmission medium (e.g., via a wired connection or a wireless connection using an antenna array 430). For example, the transceiver 410 may provide a communication interface between the control system 414 and the air compressor 208, the one more outlet valves 214, the scale 216, the one or more sensors 218, and/or the anemometer 220. Depending upon the nature of the device, a user interface 412 (e.g., keypad, display, speaker, microphone, joystick) may also be provided. Of course, such a user interface 412 is optional, and may be omitted in some examples.

In some aspects of the disclosure, the processor 404 may include weight processing circuitry 440 configured for various functions, including, for example, determining a weight of a performer to fall from an elevated platform toward an airbag. For example, the weight processing circuitry 440 may be configured to implement one or more of the functions described below in relation to FIG. 5, including, e.g., block 502. The processor 404 may also include distance processing circuitry 442 configured for various functions, including, for example, measuring a distance between the elevated platform and the airbag. For example, the distance processing circuitry 442 may be configured to implement one or more of the functions described below in relation to FIG. 5, including, e.g., block 504. The processor 404 may also include velocity processing circuitry 444 configured for various functions, including, for example, determining, while the performer falls toward the airbag, a velocity the performer will reach upon impact with the airbag. For example, the velocity processing circuitry 444 may be configured to implement one or more of the functions described below in relation to FIG. 5, including, e.g., block 508. The processor 404 may also include air pressure processing circuitry 446 configured for various functions, including, for example, setting an air pressure of the airbag based on the weight and the distance prior to the performer falling toward the airbag and adjusting the air pressure of the airbag based on the velocity while the performer falls toward the airbag to optimize an energy exerted on the performer when the performer impacts the airbag. For example, the air pressure processing circuitry 446 may be configured to implement one or more of the functions described below in relation to FIG. 5, including blocks 506 and 510.

The processor 404 is responsible for managing the bus 402 and general processing, including the execution of software stored on the computer-readable medium 406. The software, when executed by the processor 404, causes the control system 414 to perform the various functions described below for any particular apparatus. The computer-readable medium 406 and the memory 405 may also be used for storing data that is manipulated by the processor 404 when executing software.

One or more processors 404 in the control system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 406 may reside in the control system 414, external to the control system 414, or distributed across multiple entities including the control system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 5:
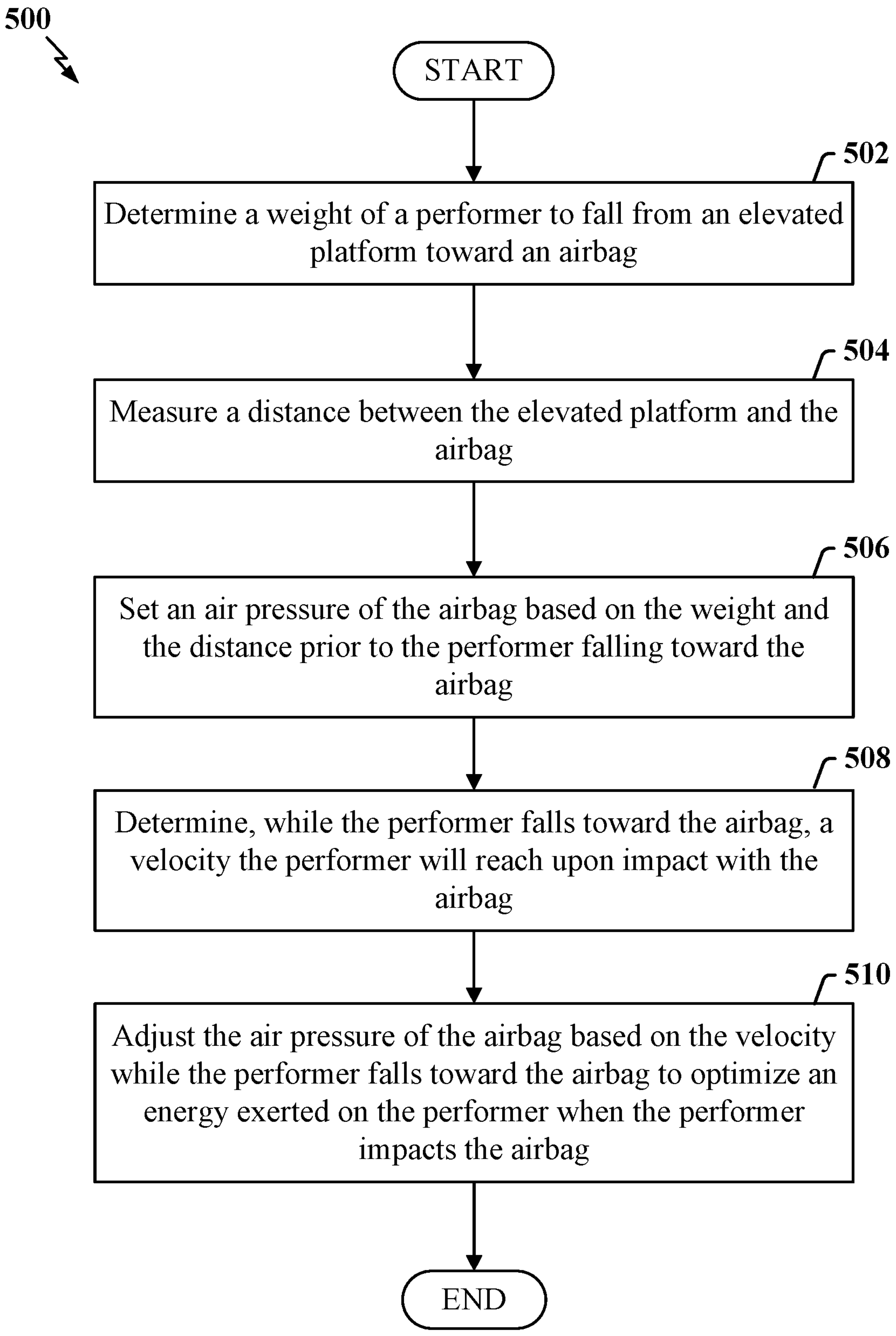
FIG. 5 is a flow chart illustrating an exemplary process for optimizing an energy exerted on a performer falling from an elevated platform and impacting an airbag according to an aspect of the present disclosure.

FIG. 5 is a flow chart illustrating an exemplary process 500 for optimizing an energy exerted on a performer falling from an elevated platform and impacting an airbag in accordance with aspects of the present disclosure. As described below, some or all illustrated features may be omitted in a particular implementation within the scope of the present disclosure, and some illustrated features may not be required for implementation of all aspects. In some examples, the process 500 may be carried out by the control system 404 of the device 400 illustrated in FIG. 4, which may be a computer, workstation, laptop, tablet, mobile phone, or any other type of electronic device capable of communicating with and/or controlling other electronic devices. In some examples, the process 500 may be carried out by any suitable apparatus or means for carrying out the functions or algorithm described below.

At block 502, the control system may determine (e.g., via the scale 216) a weight of a performer to fall from an elevated platform toward an airbag (e.g., landing pad 202). At block 504, the control system may measure (e.g., via the one or more sensors 218) a distance (e.g., distance D) between the elevated platform and the airbag.

At block 506, the control system may set an air pressure (e.g., via the air compressor 208 and/or the one or more outlet valves 214) of the airbag based on the weight and the distance prior to the performer falling toward the airbag. To set the air pressure, the control system may first calculate a theoretical velocity ($V_T$) the performer will reach upon impact with the airbag based on the distance, and then calculate a theoretical energy ($E_T$) exerted on the performer upon impact with the airbag based on the weight and the theoretical velocity ($V_T$). Thereafter, the control system may set the air pressure of the airbag based on the theoretical energy ($E_T$) prior to the performer falling toward the airbag to optimize the energy exerted on the performer when the performer impacts the airbag. In an aspect, the air pressure is set to a pressure value within a range of pressure values for optimizing the energy exerted on the performer when the performer impacts the airbag (e.g., a range of pressure values that will prevent injury to the performer when impacting the airbag).

At block 508, the control system may determine, while the performer falls toward the airbag, a velocity (an actual velocity $V_A$) the performer will reach upon impact with the airbag. The control system may determine the actual velocity ($V_A$) via the one or more sensors 218, which may include a laser range finder, an optical sensor, a lidar sensor, a radar sensor, a velocity sensor, and/or a machine vision camera, for example.

At block 510, the control system may adjust (e.g., via the air compressor 208 and/or the one or more outlet valves 214) the air pressure of the airbag based on the actual velocity ($V_A$) while the performer falls toward the airbag to optimize an energy exerted on the performer when the performer impacts the airbag. To adjust the air pressure, the control system may determine whether the actual velocity ($V_A$) is different from the theoretical velocity ($V_T$), and calculate a predicted energy ($E_P$) exerted on the performer upon impact with the airbag based on the weight and the actual velocity ($V_A$) if the actual velocity ($V_A$) is different from the theoretical velocity ($V_T$). Thereafter, the control system may adjust the air pressure of the airbag based on the predicted energy ($E_P$) while the performer falls toward the airbag. In an aspect, the air pressure is adjusted to a pressure value within a range of pressure values for optimizing the energy exerted on the performer when the performer impacts the airbag (e.g., a range of pressure values that will prevent injury to the performer when impacting the airbag).

Additionally, or alternatively, when adjusting the air pressure, the control system may detect whether the performer is misaligned with a target area (e.g., target area 302) of the airbag while the performer falls toward the airbag. For example, the control system may determine misalignment (e.g., misaligned, out of position, or off-axis with the target area) based on information received via the one or more sensors 218. In another example, the control system may determine the misalignment based on information regarding a wind velocity and/or wind direction received from the anemometer 220. Upon receiving the misalignment information, the control system may determine a predicted area (e.g., predicted area 304) of the airbag where the performer will impact the airbag. The control system may then adjust the air pressure of the airbag at the predicted area while the performer falls toward the airbag. In an aspect, the air pressure at the predicted area is adjusted to a pressure value within a range of pressure values for optimizing the energy exerted on the performer when the performer impacts the predicted area (e.g., a range of pressure values that will prevent injury to the performer when impacting the predicted area).

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object.

One or more of the components, steps, features and/or functions illustrated in FIGS. 1-5 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-5 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of optimizing an energy exerted on a performer falling from an elevated platform and impacting an airbag, the method comprising:

determining a weight of a performer to fall from an elevated platform toward an airbag;

measuring a distance between the elevated platform and the airbag;

setting an air pressure of the airbag based on the weight and the distance prior to the performer falling toward the airbag;

determining, while the performer falls toward the airbag, a velocity the performer will reach upon impact with the airbag; and adjusting the air pressure of the airbag based on the velocity while the performer falls toward the airbag to optimize an energy exerted on the performer when the performer impacts the airbag.

2. The method of claim 1, wherein the setting the air pressure comprises:

calculating a theoretical velocity the performer will reach upon impact with the airbag based on the distance;

calculating a theoretical energy exerted on the performer upon impact with the airbag based on the weight and the theoretical velocity; and setting the air pressure of the airbag based on the theoretical energy prior to the performer falling toward the airbag to optimize the energy exerted on the performer when the performer impacts the airbag.

3. The method of claim 2, wherein the air pressure is set to a pressure value within a range of pressure values for optimizing the energy exerted on the performer when the performer impacts the airbag.

4. The method of claim 2, wherein the adjusting the air pressure comprises:

determining while the performer falls toward the airbag whether the velocity is different from the theoretical velocity;

calculating a predicted energy exerted on the performer upon impact with the airbag based on the weight and the velocity if the velocity is different from the theoretical velocity; and adjusting the air pressure of the airbag based on the predicted energy while the performer falls toward the airbag.

5. The method of claim 4, wherein the air pressure is adjusted to a pressure value within a range of pressure values for optimizing the energy exerted on the performer when the performer impacts the airbag.

6. The method of claim 1, wherein the adjusting the air pressure comprises:

detecting whether the performer is misaligned with a target area of the airbag while the performer falls toward the airbag;

determining a predicted area of the airbag where the performer will impact the airbag based on the performer being misaligned with the target area; and adjusting the air pressure of the airbag at the predicted area while the performer falls toward the airbag.

7. The method of claim 6, wherein the air pressure at the predicted area is adjusted to a pressure value within a range of pressure values for optimizing the energy exerted on the performer when the performer impacts the predicted area.

8. An airbag system for optimizing an energy exerted on a performer falling from an elevated platform and impacting an airbag, the airbag system comprising:

an airbag configured to sustain an air pressure; and a control system communicatively coupled to the airbag, the control system configured to:

determine a weight of a performer to fall from an elevated platform toward the airbag, measure a distance between the elevated platform and the airbag, set an air pressure of the airbag based on the weight and the distance prior to the performer falling toward the airbag, determine, while the performer falls toward the airbag, a velocity the performer will reach upon impact with the airbag, and adjust the air pressure of the airbag based on the velocity while the performer falls toward the airbag to optimize an energy exerted on the performer when the performer impacts the airbag.

9. The airbag system of claim 8, wherein the control system configured to set the air pressure is configured to:

calculate a theoretical velocity the performer will reach upon impact with the airbag based on the distance;

calculate a theoretical energy exerted on the performer upon impact with the airbag based on the weight and the theoretical velocity; and set the air pressure of the airbag based on the theoretical energy prior to the performer falling toward the airbag to optimize the energy exerted on the performer when the performer impacts the airbag.

10. The airbag system of claim 9, wherein the air pressure is set to a pressure value within a range of pressure values for optimizing the energy exerted on the performer when the performer impacts the airbag.

11. The airbag system of claim 9, wherein the control system configured to adjust the air pressure is configured to:

determine whether the velocity is different from the theoretical velocity;

calculate a predicted energy exerted on the performer upon impact with the airbag based on the weight and the velocity if the velocity is different from the theoretical velocity; and adjust the air pressure of the airbag based on the predicted energy while the performer falls toward the airbag.

12. The airbag system of claim 11, wherein the air pressure is adjusted to a pressure value within a range of pressure values for optimizing the energy exerted on the performer when the performer impacts the airbag.

13. The airbag system of claim 8, wherein the control system configured to adjust the air pressure is configured to:

detect whether the performer is misaligned with a target area of the airbag while the performer falls toward the airbag;

determine a predicted area of the airbag where the performer will impact the airbag based on the performer being misaligned with the target area; and adjust the air pressure of the airbag at the predicted area while the performer falls toward the airbag.

14. The airbag system of claim 13, wherein the air pressure at the predicted area is adjusted to a pressure value within a range of pressure values for optimizing the energy exerted on the performer when the performer impacts the predicted area.

15. The airbag system of claim 13, wherein the control system comprises:

a scale configured to determine the weight of the performer to fall from the elevated platform toward the airbag;

one or more of a laser range finder, an optical sensor, a lidar sensor, or a radar sensor configured to:

measure the distance between the elevated platform and the airbag, and determine the velocity the performer will reach upon impact with the airbag; or an anemometer configured to monitor at least one of a wind velocity or a wind direction of wind engaging the performer while the performer falls toward the airbag.

16. An airbag control system for optimizing an energy exerted on a performer falling from an elevated platform and impacting an airbag, comprising:

at least one processor; and a memory coupled to the at least one processor, wherein the at least one processor and the memory are configured to:

determine a weight of a performer to fall from an elevated platform toward an airbag, measure a distance between the elevated platform and the airbag, set an air pressure of the airbag based on the weight and the distance prior to the performer falling toward the airbag, determine, while the performer falls toward the airbag, a velocity the performer will reach upon impact with the airbag, and adjust the air pressure of the airbag based on the velocity while the performer falls toward the airbag to optimize an energy exerted on the performer when the performer impacts the airbag.

17. The airbag control system of claim 16, wherein the at least one processor and the memory configured to set the air pressure are configured to:

calculate a theoretical velocity the performer will reach upon impact with the airbag based on the distance;

calculate a theoretical energy exerted on the performer upon impact with the airbag based on the weight and the theoretical velocity; and set the air pressure of the airbag based on the theoretical energy prior to the performer falling toward the airbag to optimize the energy exerted on the performer when the performer impacts the airbag.

18. The airbag system of claim 17, wherein the at least one processor and the memory configured to adjust the air pressure are configured to:

determine whether the velocity is different from the theoretical velocity;

calculate a predicted energy exerted on the performer upon impact with the airbag based on the weight and the velocity if the velocity is different from the theoretical velocity; and adjust the air pressure of the airbag based on the predicted energy while the performer falls toward the airbag.

19. The airbag system of claim 18, wherein the air pressure is adjusted to a pressure value within a range of pressure values for optimizing the energy exerted on the performer when the performer impacts the airbag.

20. The airbag system of claim 16, wherein the at least one processor and the memory configured to adjust the air pressure are configured to:

detect whether the performer is misaligned with a target area of the airbag while the performer falls toward the airbag;

determine a predicted area of the airbag where the performer will impact the airbag based on the performer being misaligned with the target area; and adjust the air pressure of the airbag at the predicted area while the performer falls toward the airbag.

* * * * *